Oct. 2, 1962 K. W. BENHAM 3,056,475

SANITARY PARTITIONING CUBICLES

Filed Jan. 18, 1960 5 Sheets-Sheet 1

INVENTOR.
KENT W. BENHAM

BY Reuben I. Carlson
Attorney

Oct. 2, 1962  K. W. BENHAM  3,056,475

SANITARY PARTITIONING CUBICLES

Filed Jan. 18, 1960  5 Sheets-Sheet 2

INVENTOR.
KENT W. BENHAM
BY
Reuben J. Carlson
Attorney

Oct. 2, 1962 K. W. BENHAM 3,056,475

SANITARY PARTITIONING CUBICLES

Filed Jan. 18, 1960 5 Sheets-Sheet 3

INVENTOR.
KENT W. BENHAM

BY Reuben I. Carlson

Attorney

SANITARY PARTITIONING CUBICLES

Filed Jan. 18, 1960 5 Sheets-Sheet 4

INVENTOR.
KENT W. BENHAM
BY
Reuben J. Carlson
Attorney

Oct. 2, 1962 K. W. BENHAM 3,056,475

SANITARY PARTITIONING CUBICLES

Filed Jan. 18, 1960 5 Sheets-Sheet 5

INVENTOR.
KENT W. BENHAM

BY Reuben I Carlson

Attorney

United States Patent Office 3,056,475
Patented Oct. 2, 1962

3,056,475
SANITARY PARTITIONING CUBICLES
Kent W. Benham, Gates Mills, Ohio, assignor to The Sanymetal Products Company, Inc., Cleveland, Ohio, a corporation of Ohio
Filed Jan. 18, 1960, Ser. No. 3,193
28 Claims. (Cl. 189—46)

This invention relates to sanitary partitioning cubicles, and more particularly to interior partitioning cubicles composed of relatively thin wall forming doors, supporting pilasters and dividing partitions having brackets attached to the perimetrical edges of the wall forming structure by concealed securing means, and wherein the exposed faces of the brackets are substantially flush with the exposed faces of the wall forming structure.

Partitioning cubicles designed for installation in ward rooms and rest rooms of hospitals and office buildings, should present wall surfaces which can be easily cleaned and sanitarily maintained, and substantially free of dirt collecting crevices and projections. Partitioning cubicles as heretofore made for such uses, have been composed of wall forming structures whose hinge pintle mounting brackets and corner brackets are secured by exposed bolts and the like fastening means which together present projecting parts and crevices where dirt invariably collects.

This invention is directed to the provision of improved door and wall forming structures for partitioning cubicles, which can be easily cleaned and kept in sanitary condition, and whose pintle supporting brackets and corner brackets are substantially flush with the exposed sides and edge faces of the structural body with which they are associated. Door and wall forming structures made in accordance with this invention can be fabricated from relatively few parts and assembled together in a minimum number of assembly operations to provide door and wall forming structures which are strong and durable in use, can be easily and quickly erected in the field, and which provide partitioning cubicles which are highly attractive in appearance.

This invention includes the provision of a hinge pintle supporting bracket of generally S-shaped configuration, and which presents a U-shaped saddle part designed to interfit into a corresponding U-shaped cut-out extending into the hinging edge of a door or wall forming body. A pair of longitudinally aligned edge trimming legs extend in opposite directions from the spaced arms of the saddle part, and a third edge trimming leg laterally projects from one of the longitudinal edge trimming legs. The edge trimming legs of this bracket present exposed faces which are symmetrically shaped in contoured conformity with the adjacent edge surfaces of the door or wall forming body. The saddle part of this hinge bracket presents a pair of spaced rim forming flanges which interfit and interlock with recessed ledge portions which rim the U-shaped cut-out in the door or wall forming body, with the rim forming flanges of the bracket so shaped and proportioned that the outer faces thereof are substantially flush with the adjacent facing surfaces of the structural body on which the bracket is mounted.

This invention also comprehends the provision of a companion hinge pintle supporting bracket designed to be applied to a notched out corner of a door or wall forming body. This hinge pintle supporting bracket presents an arm section having an edge trimming leg projecting from one end thereof, and an offset saddle section joined to the other end of the arm section by a connecting hip section. The arm section, hip section and the saddle section of this bracket presents a pair of spaced rim forming flanges designed to interfit and interlock with inset ledge portions which rim the corner cut-out in a manner so that the outer faces of the rim forming flanges are substantially flush with the adjacent facing surfaces of the structural body. The edge trimming leg of this pintle supporting bracket presents an inner face designed to firmly seat against an adjacent edge section of the wall forming body, and presents an exposed outer face which is symmetrically shaped in contour conformity with the adjacent contoured edge of the structural body.

This invention also comprehends the provision of an angular corner bracket presenting angularly extending edge trimming legs whose inner faces are designed to interfit and interlock with adjacent corner edge sections of the structural body, and whose outer faces are symmetrically shaped in contoured conformity with the adjacent contoured edges of the structural body.

The brackets of this invention further feature a tongue portion which projects from the end of each terminal edge trimming leg, and which is designed to telescope into and interlock with the adjacent contoured edge formation associated with the structural body, to thereby rigidly secure the bracket to the structural body. The contoured faces of the terminal edge trimming legs of these brackets also form flush and fine line joints with the contoured faces of the adjacent terminal ends of the edge moulding formations of the structural body. This invention also includes the provision of outwardly projecting ribs extending from those edge sections of the structural body against which the inner faces of the bracket edge trimming legs are designed to seat, with the inner face of each edge trimming leg and tongue portion presenting a longitudinal groove which receives and interlocks with the adjacent rib projecting from the wall forming structure.

Brackets made in accordance with this invention are particularly adapted for association with relatively thin wall structures which measure less than two inches in thickness, and in the order of approximately only one inch in thickness. Wall and door forming bodies with which these brackets are associated may be solid or hollow, and may be made from wood, metal or plastic sheets, or other building materials, having appropriately shaped edge sections, rib formations, edge moulding formations and notch cut-outs with which these brackets are designed to interfit. The brackets of this invention are particularly adapted for association with wall and door forming structures assembled from metal or plastic sheet materials, and filled with sound insulating and reinforcing packing.

This invention accordingly embraces certain improvements in wall and door forming structures particularly designed for association with the hinge brackets of this invention, and which can be economically assembled at relatively low cost. These improved structural bodies are preferably formed from a pair of panel facing sheets which are cut and pressed into pan-shaped form, and then secured together, with suitable sound deadening and reinforcing insulation sandwiched therebetween. The paired pan-shaped facing sheets as secured together present side wall facing sections having inturned flange sections extending around the perimetrical edges of the side wall facing sections, except where interrupted by the notch cut-outs designed to receive the hinge pintle supporting brackets of this invention. The notch cut-outs of the paired facing pans are rimmed by inwardly extending ledge portions shaped to interfit with the rim forming flanges of the pintle supporting brackets as applied thereto. The shape conforming ledge portions terminate in projecting flange portions designed to interfit and interlock with concealed grooves presented by the applied hinge pintle supporting brackets.

Those parts of the edge sections of the facing pans which will be covered by the edge trimming legs of these brackets, also present outwardly projecting ribs designed to project into and interlock with corresponding longitudinal grooves formed in the concealed inner faces of the edge trimming legs of the applied brackets. Those parts of the edge forming sections or flanges of the facing pans which are not to be covered by the edge trimming legs of the applied brackets, may be contoured in conformity with the outer faces of the edge trimming legs, or may present outwardly flared lip sections which are externally welded together, and over which semi-tubular edging strips may then be telescoped, and with the outer contoured faces of the adjacent edging strips forming substantially flush line joints with the adjacent edge trimming legs of the applied brackets.

When the brackets of this invention are mounted on the perimetral edges of appropriately shaped wall forming structures made in accordance with this invention, all securing means are substantially concealed from view, with all exposed faces of these brackets substantially flush with the adjacent exposed faces of the wall structure, with the elimination of all unsanitary projections and crevices. When the pintle supporting brackets of this invention are applied and secured to a door structure, precise alignment of the hinge pintles and accurate hanging of the door can be assured. These brackets may be economically moulded or cast in one piece at substantially less cost than brackets as heretofore made, and when mounted on a wall forming structure, the bracket securing means are concealed from view, presenting an assembly with flush side and edge surfaces substantially free of projections and crevices, and satisfying sanitary requirements to a maximum degree. These improved hinge brackets can also be quickly mounted during assembly of the wall forming structure in substantially less time and at less cost than required to mount and secure hinge brackets to wall forming bodies as heretofore constructed.

Other objects and advantages of this invention will become apparent as the disclosure proceeds.

Although the characteristic features of this invention will be particularly pointed out in the claims, the invention itself, and the manner in which it may be made and used, may be better understood by referring to the following description taken in connection with the accompanying drawings forming a part hereof in which:

FIG. 1 is a side elevational view of a wall forming structure in the form of a door, made in accordance with this invention, and showing the upper and lower hinge pintle supporting brackets of this invention in assembled relation to the door body, with the side faces of the brackets substantially flush with the side faces of the door body, and with the edge trimming legs of the brackets interlocking with the adjacent edging sections of the door body in a manner to provide substantially flush joints therebetween;

FIG. 2 is an enlarged fragmentary elevational view of the rear edge of the door structure as the same would appear when viewed along line 2—2 of FIG. 1, this view further illustrating the manner in which the body attaching edge trimming legs of the brackets interfit and interlock with the adjacent edge formations or strips of the door body, with the side faces of the brackets substantially flush with the side faces of the door body;

Figures 23, 24:
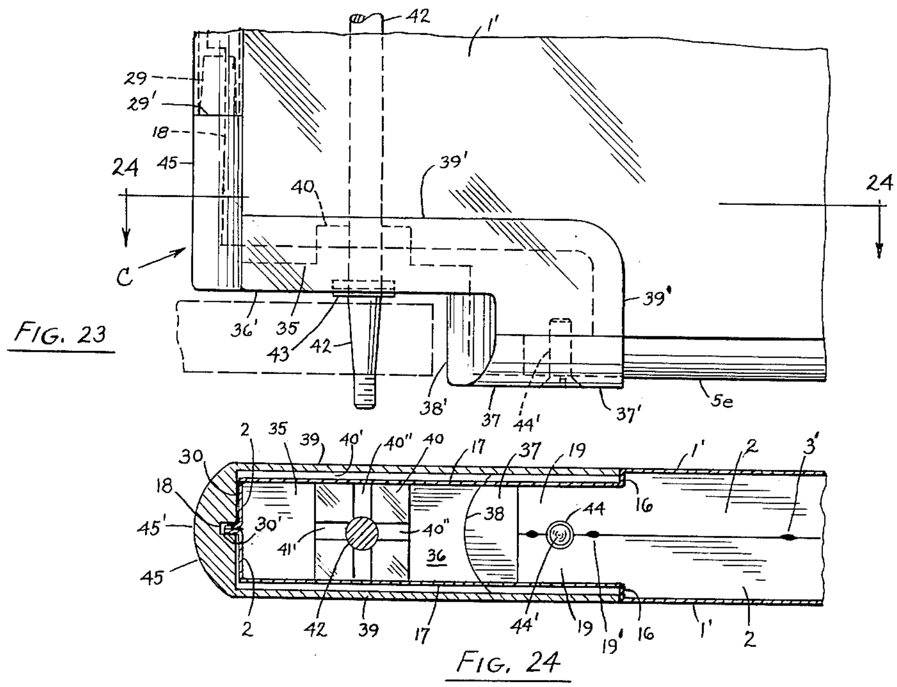
Figure 25:
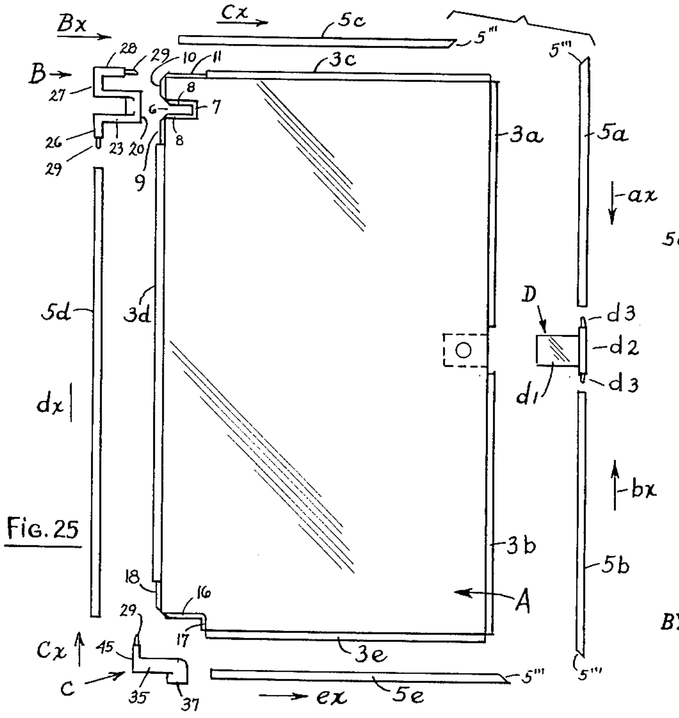

FIG. 23 is an enlarged fragmentary elevational view of the lower rear corner of the door structure showing the lower corner bracket fully assembled to the door body, this view also showing in phantom lines a fragmentary part of the hinging arm designed for attachment to the adjacent post or pilaster and on which the door structure will be swingably supported, this view also showing a fragmentary part of the hinge pintle which extends through the lower corner bracket and into the door body and which is designed to be subsequently secured to the hinging arm of the erected pilaster;

FIG. 24 is a fragmentary horizontal section of the door structure as the same would appear when viewed along line 24—24 of FIG. 23, this view showing further details of the door body and the lower corner bracket as attached thereto; and FIG. 25 is an elevational view of the door body, upper and lower corner brackets, the door latching assembly, and the edge trimming strips in exploded relation, and which illustrates the sequence in which the component parts are assembled together to provide a complete door structure.

Figures 16, 27, 28, 29:
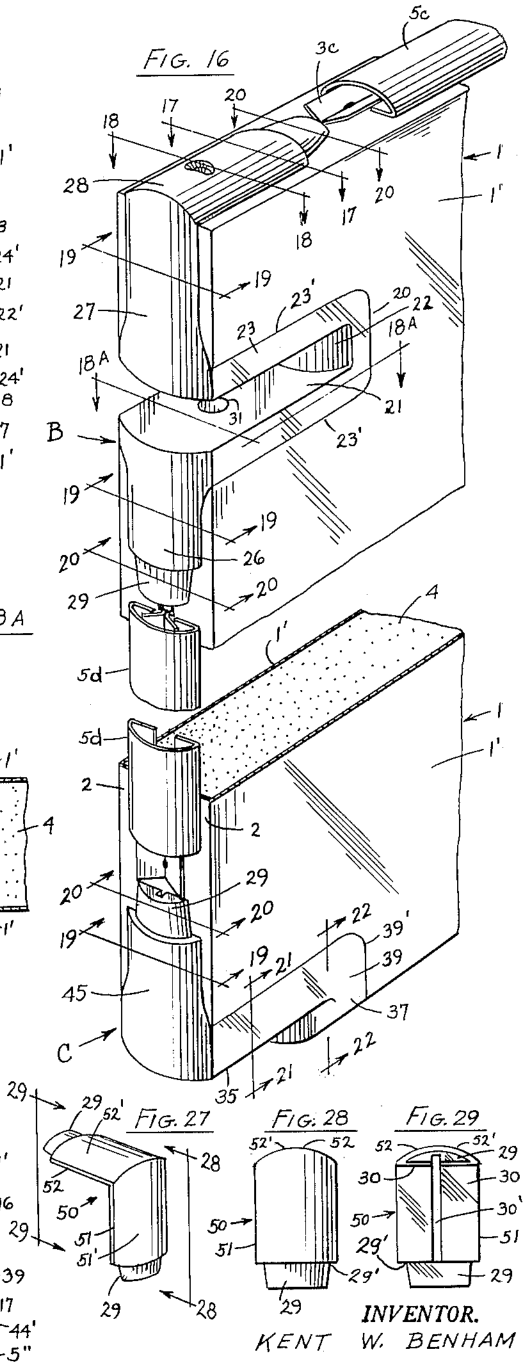
FIG. 16 is a fragmentary perspective view of the assembled door or wall structure as the same appears when the upper and lower corner brackets have been applied to the structural body thereof, this view showing adjacent end fragments of the edge trimming strips withdrawn from the locking tongues of the upper and lower corner brackets to reveal structural details.
Figure 26:
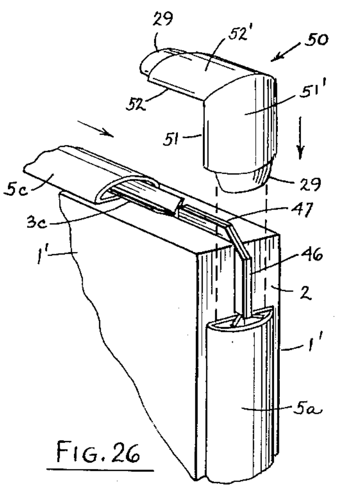

FIG. 26 is a fragmentary perspective view of a modified form of a door or wall forming body, designed for association with edge trimming strips and associated corner forming angle members formed from bright metal, and which obviates the mitre cutting and polishing of the corner forming ends of the edge trimming strips as shown in FIG. 25, and which would be necessary when the edging strips are not painted after assembly, this view showing the angular corner member in exploded relation to the structural body of the door or wall forming body;

FIG. 27 is a perspective view of the angular corner member designed for association with a body structure such as shown in FIG. 26;

FIG. 28 is an exterior elevational view of the angular corner member as the same would appear when viewed along line 28—28 of FIG. 27; and FIG. 29 is an interior view of the angular corner member as the same would appear when viewed in the direction of the arrows 29—29 of FIGS. 27.

Similar reference characters refer to similar parts throughout the several views of the drawings and the specification.

The hinge pintle supporting brackets B and C of this invention may be associated with a door or other wall forming body, but are shown for purposes of illustration as associated with a door body A. The upper bracket B and a lower bracket C are inset into notches 6 and 15 formed in the rear edge of the door body, and are rigidly secured to the door body by semi-channel shaped edge trimming strips 5 which are telescopically applied to the perimetral edges of the door body. The upper and lower corner brackets B and C and the door body A are so formed and shaped that the parts thereof interlock and interfit to provide substantially flush wall-forming surfaces and edge forming surfaces, with substantially flush joints between adjacent parts of the door body and corner brackets, providing an assembled door structure presenting flush surfaces of architectural beauty, and free of projections and cavities in which dirt and foreign matter would otherwise collect.

Figure 5:
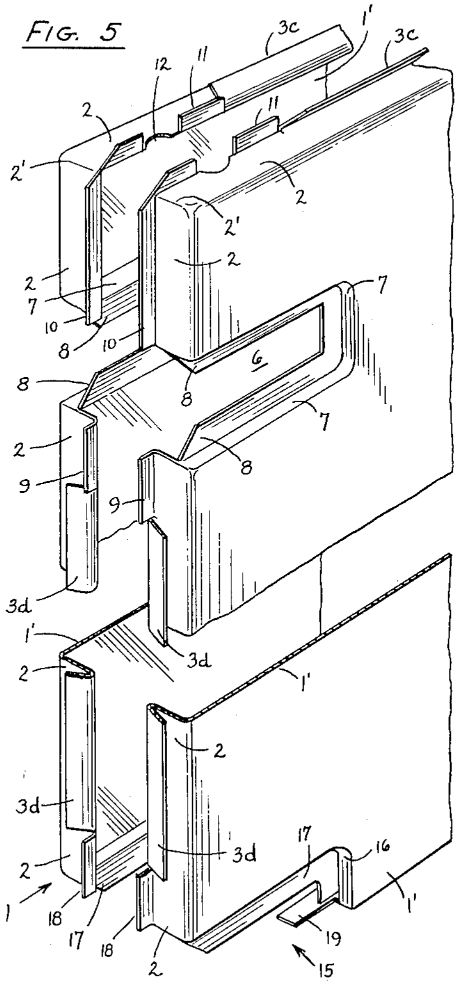
FIG. 5 is a fragmentary perspective view of the complementary facing pans in juxtaposed relation, and which further illustrates the shape into which the paired facing pans are cut and pressed to receive and accommodate the upper and lower hinge pintle supporting brackets.
Figures 4, 8:
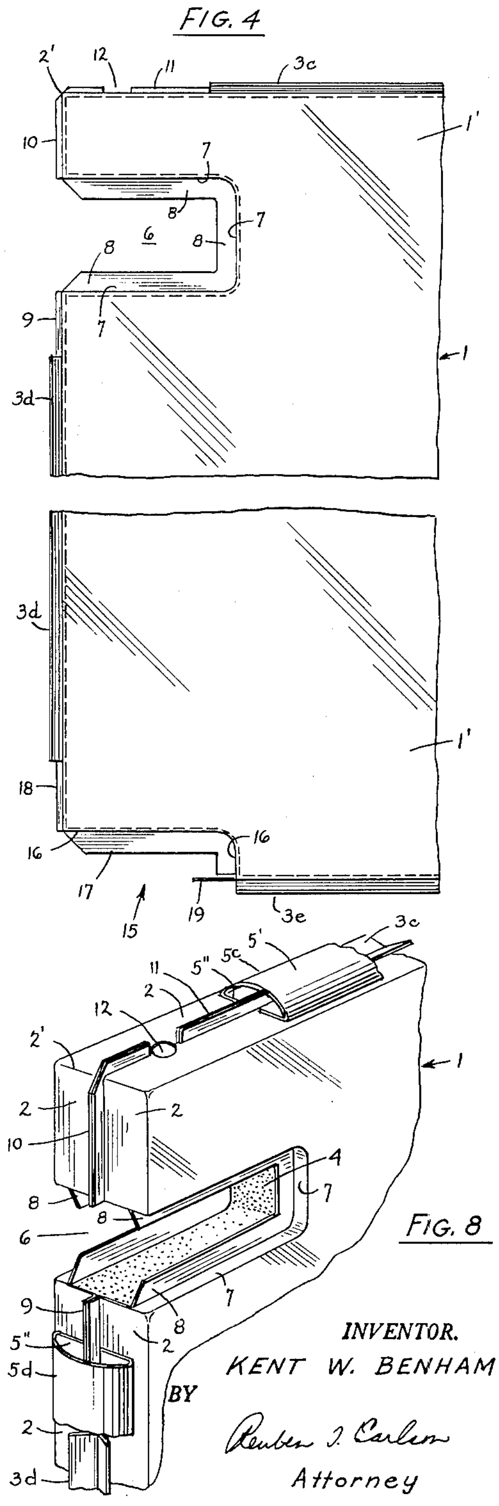
FIG. 4 is a fragmentary elevational view of one of the two complementary facing pans from which the door body is assembled, and which partially illustrates the manner in which the paired facing sheets of the door or wall forming body are cut and pressed to receive and accommodate the upper and lower hinge pintle supporting brackets.
FIG. 8 is a fragmentary perspective view of the upper rear corner of the door body as the same would appear prior to application of the upper hinge pintle supporting bracket thereto, this vew showing end fragments of the edging strips as interlocked to the outwardly flared lips of the door body and in the position the edging strips assume after the upper bracket has been applied to the door body.
Figure 6:
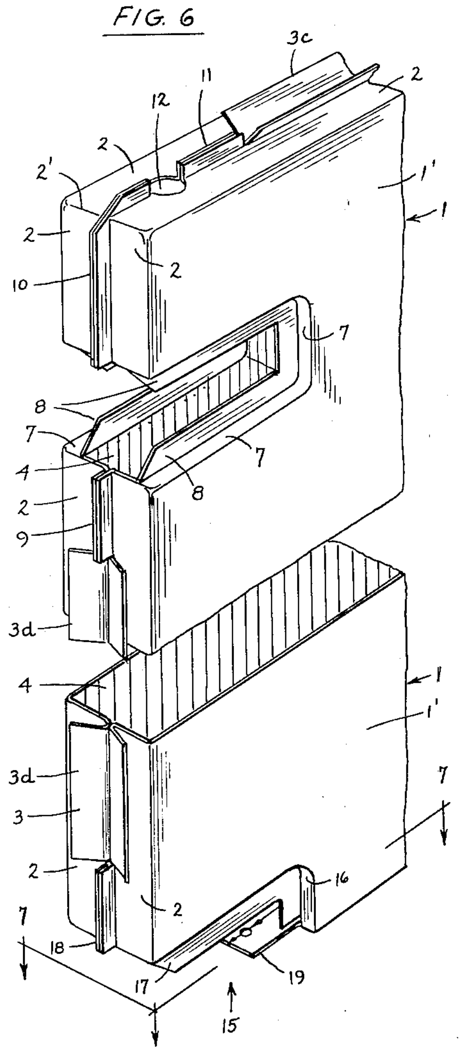
FIG. 6 is a fragmentary perspective view of the door body as it would appear when the paired facing pans have been assembled and secured together with insulating packing sandwiched therebetween, but before the edge trimming strips and upper and lower hinge pintle supporting brackets have been applied thereto.

The door body A, as shown in FIG. 1 and FIGS 4 to 9 inclusive, is preferably formed from a pair of metallic or plastic panel facing sheets which are shaped in a press into a pair of similar and complementary facing pans 1 as shown in FIGS. 4, 5 and 6. Each facing pan 1 presents a panel facing section 1′ having inturned flange sections 2 which terminate in outwardly flared lip sections 3, except at those edge areas where the upper and lower corner brackets B and C and the face plate of the latch assembly D are to be applied as shown in FIG. 25. A suitable insulating core or filler 4 is sandwiched between the panel facing sections 1′ and adhesively secured to the inner surfaces thereof. The paired and outwardly flared lip sections 3 as presented by the complementary facing pans 1, and extending along the front vertical edge, the top and bottom horizontal edges, and the rear vertical edge of the door body, are secured together by spot welds 3′ externally applied to the crotch between the adjacent outwardly flared lip sections 3, to provide a rigid door body.

The semi-tubular edge trimming strips 5 are telescopically applied in proper sequential order to the paired outwardly flared lip sections 3 of the door body during application of the door latch assembly D and the upper and lower corner brackets B and C to the door body, as illustrated in FIG. 25 and hereafter more fully explained. Each semi-tubular edge trimming strip 5 presents a facing portion 5′ which may be attractively contoured to an arcuate shape, and from which a pair of inturned lip portions 5″ extend. The lip portions 5″ are designed to seat against the adjacent flange sections 2 and interlock with the paired outwardly flared lip sections 3 of the door body.

In forming the door body A, a pair of similar facing sheets are separately cut to the proper shape and size, and then shaped in a die press whose dies bend and form the perimetrical edges of the facing sheets to provide a pair of complementary facing pans as shown in FIGS. 4–8. Each facing pan 1 is deep drawn by the press dies so that the flange sections 2 extend at right angles to the panel facing section 1′ and form finished and unsevered corners 2′ as shown in FIG. 5, with the outflared lip sections 3 extending at an angle of approximately thirty to forty-five degrees to the adjacent flange section 2. Each facing pan 1 presents an upper bracket receiving cut-out 6 to provide a generally U-shaped recess extending into the facing panel section 1′, and which is rimmed by an inset ledge portion 7 which terminates in a flange portion 8 which is substantially parallel to but inset with respect to the facing panel section 1′; and extends around the U-shaped cut-out 6. The inset ledge portion 7 provides a pocket which snugly receives a side wall of the U-shaped saddle part 20 of the upper corner bracket B, as hereafter more fully explained.

The upper end of the outwardly flared lip section **3*d* which extends along the rear edge of the facing pan, terminates short of the notched cut-out 6 as shown in FIG. 5, and is replaced by a relatively short rib portion 9 which extends laterally and substantially at right angles to the flanged section 2 with which it is integrally formed. A similar rib portion 10 extends from the notched cut-out 6 to the upper corner of the facing pan 1 and also projects laterally substantially at right angles from the flange section 2 with which it is integrally formed. The lip section 3*c* which extends along the upper horizontal edge of the facing pan as shown in FIG. 5, terminates short of the upper rear corner of the facing pan and is replaced by a laterally extending rib portion 11 which projects laterally substantially at right angles from the flange section 2 with which it is integrally formed. When the complementary facing pans 1 are secured together in assembled relationship by the spot welds 3′ externally applied to the paired and outwardly flared lip sections 3, the rib portions 11, 10 and 9** are brought into abutting relation and provide corresponding laterally projecting ribs which interfit with corresponding grooves formed along the inner surfaces of the upper S-shaped corner bracket B. It will be noted by referring to FIGS. 4, 5 and 6 that the horizontal rib portions 11 are interrupted by a hole 12 extending through the adjacent flange sections 2 and which is designed to receive the upper pivot pin 32 associated with the upper corner bracket B.

The lower rear corner of each of the complementary facing pans 1 is also provided with a corner cut-out 15 as shown in FIGS, 4, 5 and 6 which is defined by a depressed ledge portion 16 of L-shaped form which terminates in a depressed flange portion 17 extending generally parallel but inset with respect to the facing panel section 1' of the facing pan 1. The lower end of the outwardly flared lip section 3*d* which extends along the rear vertical edge of the facing pan, terminates short of the notched cut-out 15, and is replaced by a rib portion 18 which extends laterally and substantially at right angles to the adjacent flange section 2 of the facing pan. When the complementary facing pans 1 have been secured together in integral assembly, the paired rib portions 18 together provide a laterally projecting rib designed to extend into and interlock with a corresponding groove formed along the inside face of the vertically extending leg of the lower corner bracket C. The depressed ledge portions 16 are designed to provide a receiving pocket for the flush reception of the side walls of the lower corner bracket B when mounted on the door body.

Figure 7:
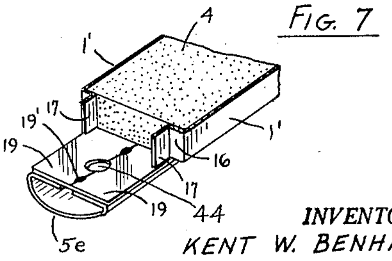
FIG. 7 is a fragmentary sectional view of the lower rear corner of the door body as viewed in the plane of line 7—7 of FIG. 6, and as the same would appear after the edging strip has been applied to the lower horizontal edge of the door body but before the lower hinge pintle supporting bracket has been applied thereto.

The outwardly flared lip sections 3*e* which extend along the lower horizontal edge of the door body, terminate at the notch cut-out 15; but the inturned flange sections 2 extending along the lower horizontal edge of the door body may be provided with end extensions 19 which project into the cut-out 15 as shown in FIGS. 4, 5, 6 and 7. The end extensions 19 provide additional support for the attaching screw 44' which secures the saddle section of the lower corner bracket B to the lower horizontal edge of the door body, as hereafter more fully described. The bottom flange extensions 19 extend between the depressed ledge portions 16 and may be secured together by spot welds 19' as shown in FIG. 7.

The inturned flange sections 2 along the front edge of the door body have a conforming hole cut therein through which the body section *d*1 of the latch assembly D is inserted as shown in FIG. 25, and the outwardly flared lip sections 3*a* and 3*b* extending along the front edge of the door body terminate short of the latch body receiving hole to accommodate the face plate *d*2 of the latch assembly D. The complementary facing pans 1 when formed and assembled, as above described, present a pair of upper and lower lip sections 3*a* and 3*b* along the front edge of the door body which extends from the latch body receiving hole to the upper and lower corners of the facing pans; a pair of upper horizontally extending lip sections 3*c* which extend from the upper front corner of the facing pans to the horizontal rib portions 11; a pair of vertically extending lip sections 3*d* which extend from the lower end of the rib portions 9 at the upper end of the door, to the upper end of the rib portions 18 at the lower end of the door; and a pair of outwardly flared lip sections 3*e* which extend along the lower edge facing pans from the front lower corner thereof to the notch cut-out 15.

The door body A is assembled in the form shown in FIG. 6 by adhesively bonding the sound insulating filler 4 to the inside face of one of the complementary facing pans 1 when cut and shaped into the form shown in FIGS. 4 and 5. The exposed face of the sound insulating filler 4 is then coated with adhesive and the companion and complementary shaped facing pan 1 then telescoped over the inserted filler and pressed into adhesive contact therewith. Spot welds 3' are then exteriorly applied between the adjacent outwardly flared lip sections 3*a*, 3*b*, 3*c*, 3*d* and 3*e* to bond the facing pans together in integral assembly. The paired rib portions 9, 10, 11 and 18 will then reside in overlapping and abutting relationship, and may also be spot welded together as desired.

When the door body A has been assembled in the form shown in FIG. 6, the projecting body *d*1 of the door latch assembly D is first inserted in the receiving hole formed in the inturned flange sections 2 of the door body, the semi-channel shaped edge trimming strips 5*a* and 5*b* then telescopically applied to the correspondingly paired outturned lip sections 3*a* and 3*b*, the upper and lower edge trimming strips 5*c* and 5*e* then telescopically applied to the upper and lower outturned lip sections 3*c* and 3*e* of the door body; the upper corner bracket B is next applied to the door body A; the semi-tubular edge trimming strip 5*d* then telescopically applied to the paired flange sections 3*d*, and as the final assembly operation, the lower corner bracket C is applied to the door body, in the manner more particularly illustrated in FIG. 25.

Figure 10:
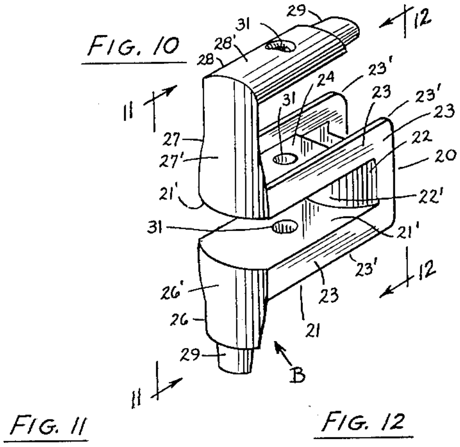
FIG. 10 is a perspective view of the upper hinge pintle bracket designed to be applied to the upper rear corner of the door or wall forming body when assembled in the form shown in FIG. 6.
Figure 11:
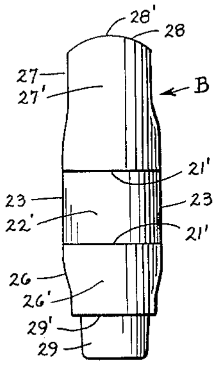
FIG. 11 is an exterior elevational view of the upper corner bracket as the same would appear when viewed in the direction of the arrows along line 11—11 of FIG. 10.
Figure 12:
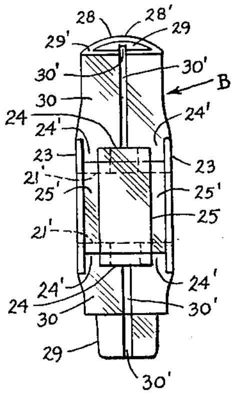
FIG. 12 is an interior elevational view of the upper corner bracket as the same appears when looking toward the inside face thereof and in the direction of the arrows along line 12—12 of FIG. 10.

The upper corner bracket B as shown in FIGS. 10, 11 and 12, may be integrally cast or moulded from metal or tough plastic into generally S-shaped form. The upper corner bracket B presents a generally U-shaped saddle part 20 shaped and designed to fit within the U-shaped cut-out 6 in the door body, an edge trimming leg 26 extending downwardly from the lower arm of the U-shaped saddle part 20, an edge trimming leg 27 extending upwardly from the upper arm of the saddle part 20, and a horizontal edge trimming leg 28 projecting laterally from the upper end of the upwardly extending leg 27 and extending parallel to the horizontal arms of the saddle part 20.

Figure 1:
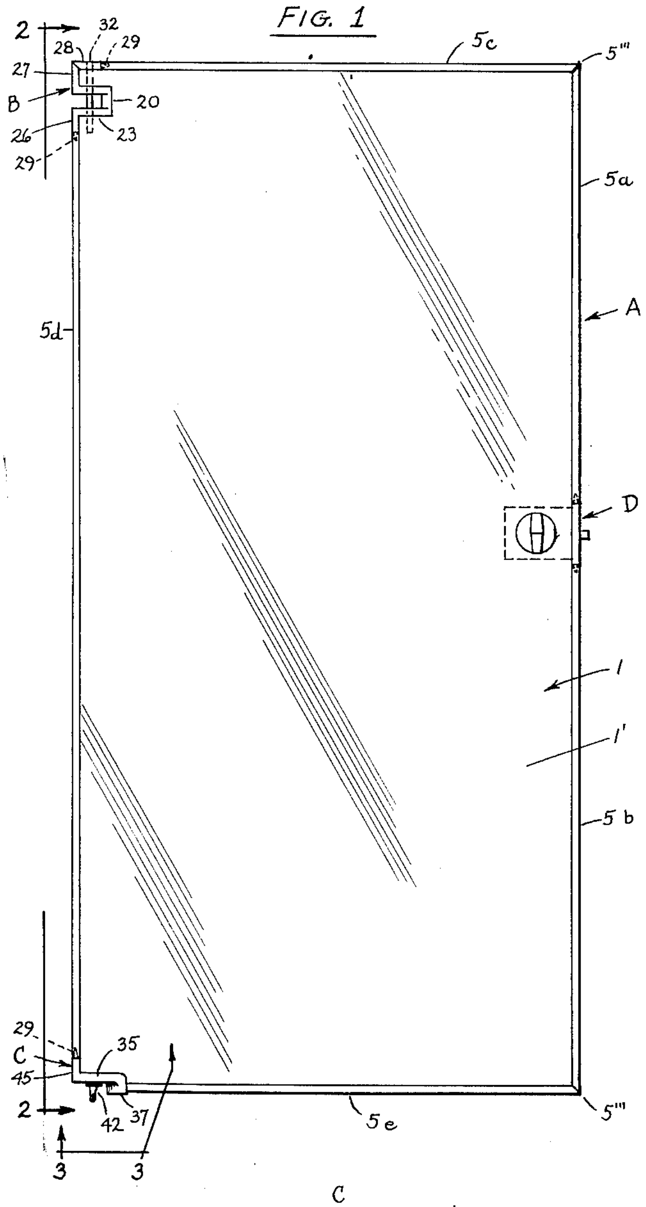
Figure 2:
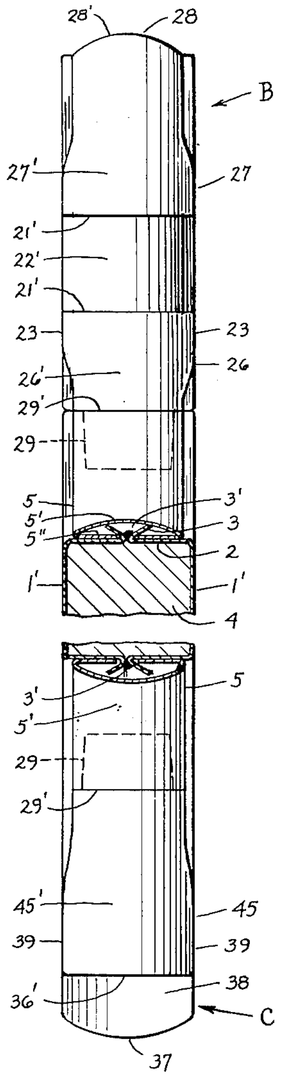
Figure 3:
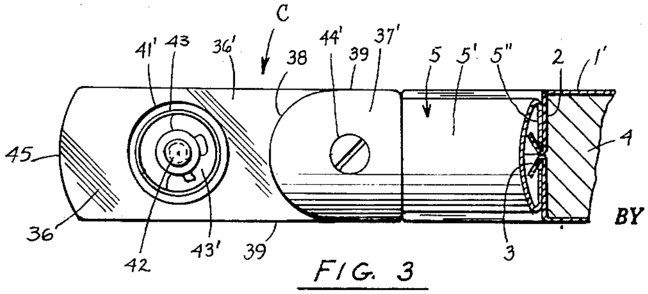
FIG. 3 is an enlarged fragmentary bottom edge view of the door structure as the same would appear when viewed along line 3—3 of FIG. 1, this view further illustrating the manner in which the lower hinge pintle supporting bracket is attached to and interfits with the lower rear corner of the door body.

The upper and lower horizontal arms of the saddle part 20 present parallel extending web sections 21 having flat inner faces 21', and are joined by a vertically extending web section 22 having a rounded inner face 22'. The inner faces 21' of the upper and lower web sections 21 are spaced apart a sufficient distance to provide a pocket which receives the hinging arm of an adjacent pilaster attached hinge bracket, as shown in FIG. 1 of U.S. Patent 2,876,874. The horizontal web sections 21 and the vertical web section 22 are rimmed by a pair of continuous rim forming flanges 23 designed to be snugly pocketed within the inset ledge portions 7 of the door body A, with the perimetrical edges 23' of the rim forming flanges 23 smoothly interfitting with the adjacent inset ledge portions 7 to provide a fine line joint therebetween as shown in FIG. 16, and with the outer faces of the rim forming flanges 23 substantially flush with the outer faces of the surrounding facing panel sections 1' of the door body.

Figures 17, 18, 18A, 19, 20:
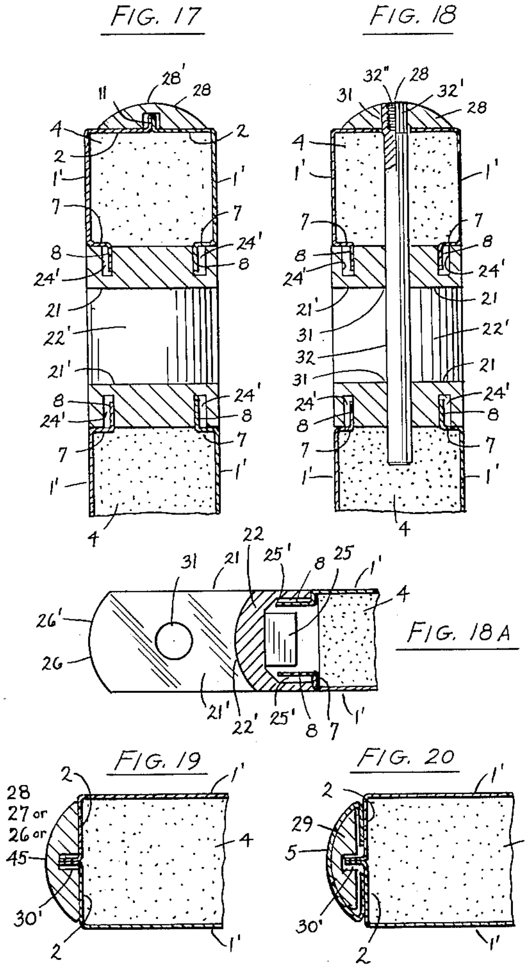
FIG. 17 is a fragmentary vertical section through the door structure as the same appears when viewed along line 17—17 of FIG. 16.
FIG. 18 is another vertical section through the door body as the same appears when viewed along line 18—18 of FIG. 16, this view also showing the upper hinge pintle insered in operative position into the upper corner bracket and the wall body.
FIG. 18A is a fragmentary horizontal section of the door structure as the same appears when viewel along line 18A—18A of FIG. 16.
FIG. 19 is a fragmentary section of the assembled door structure as the same appears when viewed along any of the lines 19—19 of FIG. 16.
FIG. 20 is another fragmentary section of the door structure as the same would appear when viewed along any of the lines 20—20 of FIG. 16.

A pair of block portions 24 formed integral with the upper and lower web sections 21 of the U-shaped saddle part 20, extend between but spaced from the adjacent rim forming flanges 23 to provide a pair of grooves 24' therebetween into which the upper and lower flange portions 8 of the notched cut-out 6 in the door body A are designed to project, as shown in FIGS. 17 and 18. A similar block portion 25 is formed integral with and projects from the vertical web section 22, and its side faces are also spaced from the adjacent rim forming flanges 23 to provide paired grooves 25' therebetween for the reception of the flange portions 8 of the notched cut-out 6, as shown in FIG. 18*a*.

The downwardly extending edge trimming leg 26 has an attractively contoured outer face 26' which is tapered to merge into the outer faces of the adjacent horizontal portions of the rim forming flanges 23, and the lower end thereof is contracted in area so that its arcuate outer face 26' is in size and shape conformity to the arcuate facing portion 5' of the vertical edging strip 5*d* as shown in FIG. 16. The upwardly extending edge trimming leg 27 also presents a similar attractively contoured outer face 27' whose lower end merges into the side faces of the adjacent horizontal portions of the rim forming flanges 23, and whose upper end is contracted in area to conform to the size and contour of the semi-tubular edge trimming strips 5. The horizontally extending edge trimming leg 28 which extends inwardly from the upper end of the upwardly extending edge trimming leg 27, has a contoured outer face 28' which merges smoothly at a right angle into the contoured outer face 27′ of the upwardly extending edge trimming leg 27.

A tongue portion 29 extends from the terminal end of the downwardly extending edge trimming leg 26 and from the terminal end of the horizontal edge trimming leg 28 and is designed to telescope into the adjacent end of the respective semi-tubular edge trimming strips 5*d* and 5*c*. The base of each tongue 29 is of less cross-sectional area than the adjacent end of the edge trimming legs 26 and 28 of which it forms a part, to provide inner and outer shoulders 29′ against which the adjacent end of the edge trimming strip 5*d* or 5*c* abuts to provide a smooth and flush line joint therebetween.

The downwardly extending edge trimming leg 26, the upwardly extending edge trimming leg 27, and the horizontal edge trimming leg 28, each presents a flat inside face 30, designed to snugly seat against the outer faces of the adjacent inturned flange sections 2 of the door body. A longitudinally extending groove 30′ is formed in the inner faces 30 of the edge trimming legs 26, 27 and 28, and also in the inner faces of the tongue portions 29, for the reception of the adjacent paired rib portions 9, 10 and 11 projecting from the flange sections 2 of the door body.

The horizontal edge trimming leg 28, and the upper and lower web sections 21 of the U-shaped saddle part 20 of the S-shaped bracket B, are provided with aligned holes 31 extending therethrough for the reception of a hinge pintle 32. The hinge pintle 32 is provided with a knurled head portion 32′ designed to grip the inner perimeter of the hole 31 formed in the horizontal edge trimming leg 28, and thus hold the hinge pintle 32 against rotation. When placed in operative position, the upper end of the hinge pintle 32 is substantially flush with the outer contoured face 28′ of the horizontal edge trimming leg 28 as shown in FIG. 18. The upper end of the hinge pintle 32 may be provided with a threaded socket 32″ to which a threaded tool may be applied to facilitate withdrawal of the hinge pintle 32.

Figure 13:
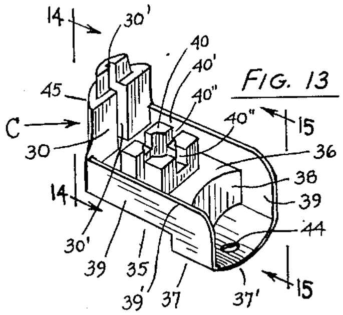
FIG. 13 is a perspective view of the lower hinge pintle supporting bracket designed to be applied to the lower rear corner of the door or wall forming body when assembled in the form shown in FIG. 6.
Figure 14:
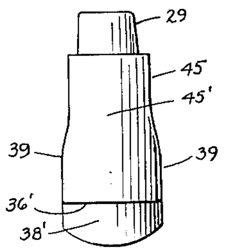
FIG. 14 is an exterior elevational view of the lower corner bracket as the same would appear when viewed in the direction of the arrows along the line 14—14 of FIG. 13.
Figure 15:
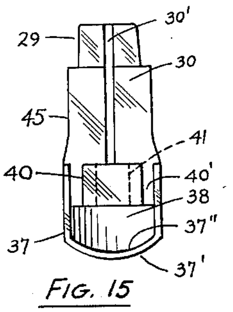
FIG. 15 is an interior elevational view of the lower corner bracket as the same appears when looking towards the inside face thereof and when viewed in the direction of the arrows along line 15—15 of FIG. 13.

The lower corner bracket C, as shown in FIGS. 13–15, may be integrally cast or moulded from suitable metal or a tough plastic compound, and is designed to be set within the lower rear corner cut-out 15 of the door body. The corner bracket C is designed to support the weight of the door structure when swingably mounted on a hinge pintle rod 42 fixed to the projecting arm of a supporting bracket attached to the edge of a supporting pilaster such as shown in FIG. 1 of U.S. Patent 2,876,874. The lower corner bracket C presents a horizontal arm 35 extending into the notched cut-out 15 of the door body, and an edge trimming leg 45 extending vertically therefrom, as shown in FIGS. 13, 14 and 15.

The horizontally extending arm 35 presents a main web section 36 connected to a depressed saddle section 37 by a vertically extending hip wall 38. The web section 36, hip wall 38 and saddle section 37 are rimmed by a pair of spaced rim forming flanges 39 of generally L-shaped form, and which are designed to interfit with the depressed ledge portions 16 formed in the facing pans 1 of the door body A, with the perimetrical edge 39′ of the L-shaped rim forming flanges 39 forming substantially flush and thin line joints with the adjacent facing panel sections 1′ of the door body.

Figures 21, 22:
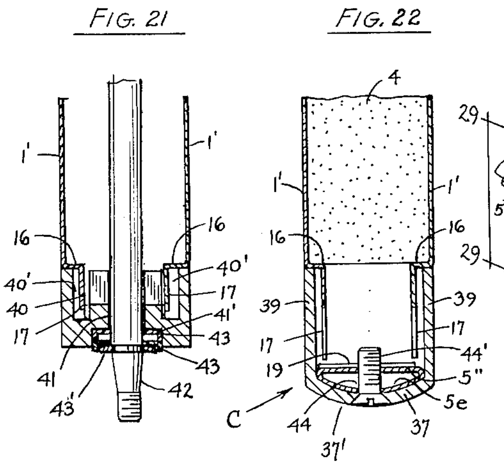
FIG. 21 is a fragmentary vertical section through the lower rear corner of the door structure as the same would appear when viewed along line 21—21 of FIG. 16, this view also showing the lower hinge pintle extending through the lower corner bracket and into the door body and on which the lower corner bracket is swingably journaled.
FIG. 22 is another fragmentary vertical section of the lower edge of the door body as the same would appear when viewed along line 22—22 of FIG. 16, this view showing further details of the manner in which the saddle section of the corner bracket is secured to the lower horizontal edge of the door body.

The inner face of the web section 36 presents a pivot block 40 which may be integrally formed therewith, and whose side faces are spaced from the inside faces of the adjacent rim forming flanges 39 to provide grooves 40′ therebetween in which the depressed flange portions 17 of the door body may be pocketed as shown in FIG. 21. A pintle receiving bearing hole 41 extends through the pintle block 40 and merges into an enlarged bearing receiving pocket 41′ formed in the otherwise substantially flat underface 36′ of the main web section 36. A pivot rod 42 as shown in FIG. 21 extends through the bearing hole 41 in the pivot block 40 and supports a thrust bearing 43 designed to be contained within the bearing pocket 41′, with the thrust bearing 43 supported by a clamp ring 43′ clamped to the pintle rod 42 as shown in FIG. 21. The lower end of the pintle rod 42 is designed to be secured to the supporting arm of the pilaster attached hinge bracket, with the lower corner bracket C and with the door body A as supported thereby free to swing or pivot on the pintle rod 42. The pintle block 40 may also be provided with radially extending cross slots 40″ formed therein, designed to receive corresponding cross ribs formed in the lower end of a door operating cam member contained within the door body.

Figure 9:
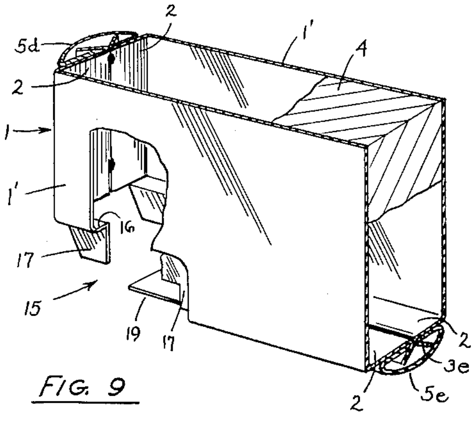
FIG. 9 is a fragmentary perspective view of the lower rear corner of the door body as the same would appear prior to application of the lower hinge pintle supporting bracket thereto, this view showing the position the edging strips assume after the lower bracket has been applied thereto.

The saddle section 37 of the lower corner bracket C presents a generally arcuate outer face 37′ and an arcuate inner face 37″ which snugly overlaps the arcuate facing portion 5′ of the lower horizontal edge trimming strip 5*e* which projects into the saddle section 37, together with the end extensions 19 of the inturned flange sections 2 extending along the lower edge of the door body as shown in FIGS. 9 and 23. Aligned screw receiving holes 44 extend through the saddle section 37, the adjacent end portion of the edge trimminng strip 5*e* and the end extensions 19, and through which a securing screw 44′ having an inset head may be inserted and threadably secured to the end extensions 19 as by means of a Tinnerman nut applied thereto. As thus assembled, only a relatively thin free edge of the saddle section 37 overlaps the contoured outer facing portion 5′ of the horizontally extending edge trimming strip 5*e*, and which edge is relatively invisible when the door structure is mounted in hung position. The exposed outer face 38′ of the hip wall 38 is generally arcuate in form to permit free swinging movement of the door structure as mounted on the hinge supporting arm of the adjacent supporting pilaster.

The edge trimming leg 45 of the lower corner bracket C extends vertically from the horizontal web section 36 thereof, and presents an attractively contoured outer face 45′ which tapers smoothly into the adjacent outer faces of the rim forming flanges 39. The upper end of the edge trimming leg 45 has an outer face contour 45′ which corresponds to the contoured outer face 5′ of the adjacent vertically extending edge trimming strip 5*d* when the door structure is fully assembled. The upper end of the edge trimming leg 45 terminates in an upwardly projecting tongue portion 29 whose base is of lesser cross-section than the adjacent end of the edge trimming leg 45 from which it extends, and is designed to telescope into the adjacent end of the semi-channel shaped edge trimming strips 5*d*, with the terminal end of the edge trimming strip in snug abutting relation to the inner and outer shoulders 29′ at the base end of the tongue portion 29. The inner face 30 of the edge trimming leg 45 flatly seats against the adjacent inturned flange portions 2 of the door body. A vertically extending groove 30′ is formed in the inner face 30 of the edge trimming leg 45 and in the rear face of the tongue portion 29 projecting therefrom, and which is designed to receive the paired rib portions 18 projecting rearwardly from the adjacent flange sections 2 of the door body adjacent the corner cut-out 15.

Door structures made in accordance with this invention are constructed from relatively few simple parts which can be shaped by the use of high speed production machines and methods, and then assembled together in a minimum number of operations to provide a door structure of great strength and rigidity, presenting substantially flush wall surfaces throughout and substantially free of dirt collecting crevices and projections, and whose hardware components are rigidly mounted on the door body without visible securing means, providing an assembled door structure of highly attractive architectural symmetry and beauty, and which can be manufactured at less cost than door structures of corresponding quality as heretofore made. The door structures of this invention may be made of any desired thickness, but are particularly adapted to be made in thicknesses of approximately one inch or less. The complementary facing pans 1 formed from two facing sheets are cut on a die press to the proper shape and size in a single cutting operation, and the cut sheet then drawn and shaped into a facing pan in a single deep drawing and forming operation.

The sound insulating core 4 may comprise an expanded fibreboard core, a fiberglass slab or foamed plastic, and is first adhesively bonded to the inside face of one of the facing pans 1, its opposite exposed face then coated with adhesive, and the complementary facing pan 1 then applied and pressed into adhesive contact with the insulating core in a continuous production operation. A few spot welds 3′ are then externally applied to the adjacent outwardly flared lip sections 3 of the assembled facing pans 1 to provide a strong and rigid door body.

The door latch assembly D may be constructed in the form disclosed in U.S. Patent 2,876,873. As shown in FIG. 25, the door latch assembly D is applied to the door body by inserting the body section *d1* thereof through the conformed hole formed in the inturned flange sections 2 at the front edge of the door body, and the contoured face plate *d2* thereof snugly seated against the perimetrical edges of the inturned flange sections 2 which surround the latch body insert hole. The tongue portions *d3*, which may be formed similar to the tongue portions 29 heretofore described, are then positioned to receive the adjacent square cut ends of the semi-tubular front edge moulding strips 5*a* and 5*b*. The upper and lower edging strips 5*a* and 5*b* present outer facing portions 5′ in contour symmetry with the corresponding outer face of the latch face plate *d2*, and the adjacent ends of the edging strips 5*a* and 5*b* are square cut to form flush and thin line joints therewith. The edge trimming strips 5*a* and 5*b* are cut to the proper length to extend from the latch face plate *d2* to the upper and lower corners of the door body, and the respective upper and lower ends of the edging strips 5*a* and 5*b* may be mitre cut as at 5‴. The front edging strips 5*a* and 5*b* are longitudinally telescoped over the paired lip sections 3*a* and 3*b* in the directions *ax* and *bx* as shown in FIG. 25, with the ends of the edging strips telescoped over the latch tongue portions *d3*, and the square cut ends thereof brought into snug abutment against the shouldered ends of the latch face plate *d2*.

The upper horizontal edge trimming strip 5*c* may then be longitudinally telescoped in the direction C*x* over the paired lip sections 3*c* of the door body, as shown in FIG. 25, until the mitre cut end 5‴ thereof matches the mitre cut end of the adjacent front edging strip 5*a*. The opposite square cut end of the edging strip 5*c* will then overlap a part of the rib portions 11 as shown in FIG. 8.

The upper corner bracket B may then be applied by telescoping the U-shaped saddle part 20 thereof into the U-shaped cut-out 6 of the door body in the direction B*x* as shown in FIG. 25, so that the flange portions 8 of the cut-out telescope into the spaced grooves 24′ and 25′ of the corner bracket C and so that the perimetrical edges 23′ of the rim forming flanges 23 of the bracket will snugly interfit with the depressed ledge portions 7 of the U-shaped cut-out 6, as shown in FIGS. 17, 18 and 18A. When the upper corner bracket B has thus been applied, the paired rib portions 9, 10 and 11 extending from the adjacent side flange sections 2 of the door body, will snugly telescope into the longitudinally extending grooves 30′ formed in the flat inner faces 30 of the edge trimming legs 26, 27 and 28. In this operation, the tongue portion 29 extending from the horizontal edge trimming leg 28 will also snugly telescope into the adjacent end of the upper edge trimming strip 5*c*, with its square cut terminal end thereof brought into snug abutment against the inner and outer shoulders 29′ presented by the terminal end of the edge trimming leg 28.

In the next operation the edge trimming strip 5*d* may be telescoped over the paired outwardly flared lip sections 3*d* extending along the rear edge of the door body in the direction *dx* as shown in FIG. 25, until the upper end of the edge trimming strip 5*d* is snugly telescoped over the downwardly projecting tongue portion 29 extending from the terminal end of the edge trimming leg 26 of the upper corner bracket B. As thus assembled, the upper corner bracket B is rigidly secured to the upper rear corner of the door body without visible securing means, and the outer arcuate faces 26′ and 28′ of its edge trimming legs 26 and 28 will be substantially flush with the corresponding outer arcuate faces 5′ of the vertical and horizontal extending edge trimming strips 5*d* and 5*c*.

The lower horizontal edge trimming strips 5*e* may then be telescopically applied to the paired outturned flange lip sections extending along the lower edge of the door body in the direction *ex* as shown in FIG. 25, with the mitre cut end 5‴ of the edge trimming strip 5*e* brought into matching relation with the adjacent mitre cut end 5‴ of the front edge trimming strip 5*b*. The opposite square cut end of the edge trimming strip 5*e* will then overlap the end extensions 19 of the inturned flange sections 2 extending along the lower edge of the door body as shown in FIG. 7.

Prior to application of the lower corner bracket C to the notched cut-out 15 of the door body, the lower hinge pintle rod 42 is inserted through the bearing receiving hole 41 of the lower corner bracket C, and the thrust bearing 43 is telescoped over the projecting lower end of the hinge pintle rod 42 and mounted thereon as by the clamp ring 43 as shown in FIG. 23. A pair of cooperating door operating cam members (not shown) are then assembled on the upwardly projecting extension of the hinge pintle rod 42. The lower corner bracket C, and the hinge pintle rod 42 and associated door operating cam members mounted thereon, are then applied to the notched cutout 15 of the door body A, with the inner extension of the hinge pintle rod and cam members associated therewith inserted into the door body.

In this same operation, the upwardly extending edge trimming leg 45 of the corner bracket C is applied to the adjacent inturned flange sections 2 of the door body, with the paired rib portions 18 of the door body pocketed within the vertically extending groove 30′ presented by the inner face of the edge trimming leg 45 and the tongue portion 29 projecting therefrom, and the tongue portion 29 is inserted into the lower end of the previously applied edge trimming strip 5*d* in the direction C*x* as shown in FIG. 25. When this is accomplished, the adjacent square cut end of the edge trimming strip 5*d* will snugly abut the inner and outer shoulders 29′ at the terminal end of the edge trimming leg 45 to provide a smooth and flush joint therebetween.

In this same operation, the depressed flange portions 17 associated with the corner cut-out 15 will telescope into the spaced grooves 40′ defined between the pivot block 40 and the inside faces of the adjacent rim forming flanges 39 of the bracket C. As thus applied, the depressed saddle section 27 of the bracket C will sungly overlap the adjacent end portion of the previously applied edge trimming strip 5*e*, with this end portion of the edge trimming strip and the end extensions 19 of the inturned flange sections 2 of the door body snugly pocketed within the depressed saddle section 37 as shown in FIG. 22. To complete the assembly operation, the securing screw 44′ is inserted through the aligned screw receiving holes 44 formed in the saddle section 37, the end portion of the edge trimming strip 5*e* and end extensions 19 as pocketed therein, after a Tinnerman nut has been telescoped over the end extensions 19 and the inturned lip portions 5″ of the edge trimming strip 5*e*.

When the door structure is thus assembled in accordance with this invention, the means which secure the door brackets B and C and latch assembly D to the door body are not visibly evident, since the exposed head of the securing screw 44' is invisible when the door structure is hung. To hang this door structure on the projecting hinging arms of the upper and lower hinge brackets attached to the supported pilaster, the lower projecting end of the hinge pintle rod 42 is inserted in the receiving hole formed in the projecting arm of the lower pilaster supported hinge bracket, and the hinging arm of the upper hinge bracket as attached to the pilaster is inserted between the web sections 21 of the upper door corner bracket B. The upper hinge pintle 32 can then be inserted through the aligned holes 31 in the upper corner bracket C, through the hole 12 at the upper end of the door body, and through the pivot hole in the hinging arm of the upper pilaster supported hinge bracket, and the knurled head portion 32' of the hinge pintle 32 then driven into non-rotative position into the receiving hole 31 formed in the horizontal edge trimming leg 27 of the corner bracket B.

It will be appreciated that door structures may be made in accordance with this invention which presents a pair of spaced S-shaped corner brackets B applied to notched cutouts 6 in the rear edge of the door body, with the corner bracket C eliminated. Alternatively, the S-shaped corner bracket B and the corresponding notched cut-out 6 in the door body may be eliminated, and a pair of upper and lower corner brackets C applied to corresponding notched cut-outs 15 formed in the upper rear corner as well as the lower rear corner of the door body. It will also be appreciated that corner brackets B and/or C may be applied to solid doors made from wood or other building materials, by forming notched cut-outs 6 and 15 of appropriate shape in the rear edge thereof. However, door bodies formed from sheet metal facing pans 1 and having a sound deadening and reinforcing core sandwiched therebetween, and shaped and assembled as heretofore described for the reception of corner brackets B and/or C, provide preferred door structures for building interiors because of their inherent strength and lasting qualities, and resistance to defacement and damage in use.

Door structures fully assembled as above described can be painted or finished with baked enamel finish applied to the exposed faces of the corner brackets B and C, the latch assembly D, and the edge trimming strips 5 as well as the exposed faces of the door body. If the exposed faces of the corner brackets B and C and latch assembly D are formed of bright metal, the door body A and edging strips 5 may be first painted or coated with a baked enamel finish, before the corner brackets B and C and the latch assembly D are assembled together with the door body A and edging trimming strips 5.

Where the edge trimming strips 5 as well as the exposed faces of the corner brackets B and C and the latch assembly D are to be formed of bright metal, such as aluminum, stainless steel or chrome finished metal, the exposed faces of the door body only are painted or coated with baked enamel finish. The bright metal edge trimming strips may be square cut at their adjacent ends, as shown in FIG. 26, rather than mitre cut as shown in FIG. 25, so that no burnishing or polishing operation need be performed on the adjacent meeting ends of the edge trimming strips. Such burnishing and polishing operation may be obviated by applying an angular shaped corner member 50 formed of corresponding bright metal, to the exposed corner of the door body as shown in FIG. 26. To provide for adequate securement of the angular shaped corner member 50, those parts of the inturned flange sections 2 of the body facing pans 1, are preferably provided with laterally extending and overlapping rib portions 46 and 47 as shown in FIG. 26, which are subsequently covered and concealed by the angular shaped corner member 50 as applied thereto.

The angular shaped corner member 50 presents a vertical edge trimming leg 51 joined to a horizontal edge trimming leg 52 extending at right angles therefrom, and whose outer faces 51' and 52' are arcuately contoured in conformity with the arcuate contour 5' of the adjacent edge trimming strips 5. Each of the vertical and horizontal edge trimming legs 51 and 52 presents a tongue portion 29 projecting therefrom and designed to be telescoped into the adjacent end of the edge trimming strip 5. The terminal end of each edge trimming leg 51 and 52 presents inner and outer shoulders 29' against which the square cut end of the edging strip abuts to provide a flush and fine line joint therebetween. The vertical and horizontal edge trimming legs 51 and 52 of the corner member 50 also present flat inside faces 30 as shown in FIG. 29, designed to flatly seat against the outer faces of the adjacent portions of the inturned flange sections 2 of the door body. A longitudinal groove 30' is formed in the inner faces 30 of the vertical and horizontal legs 51 and 52 as well as the tongue portions 29 thereof and into which the rib portions 46 and 47 of the door body project.

In assembling the corner member 50 to the door body A, the vertical edge trimming strip 5*a* having a square cut end is telescoped over the outwardly flared lip sections of the door body as shown in FIG. 26. The corner member 50 is then applied by telescoping the paired rib portions 46 and 47 into the grooves 30' presented by the inside faces 30 of the vertical and horizontal legs 51 and 52 thereof, and with the tongue portion 29 extending from the vertical leg 51 telescoped into the adjacent end of the vertical edge trimming strip 5*a* to provide a flush and thin line joint therebetween. The horizontal edging strip 5*c* is then longitudinally telescoped over the outwardly flared lip sections 3*c* of the door body, and the adjacent end of the edge trimming strip 5*c* snugly telescoped over the tongue portion 29 extending from the terminal end of the horizontal edge trimming leg 52, to provide a flush and thin line joint therebetween.

The angular corner member 50 as thus applied is rigidly locked to the corner of the door body without the use of screws or other visible securing means, and no burnishing or polishing of the fine line joints as defined between the ends of the bright metal edge trimming strips 5 and the arcuate outer faces 51' and 52' of the bright metal corner member 50, is required. It will be appreciated that a bright metal corner member 50 may be applied to the upper and lower front corners of door bodies equipped with paired rib portions 46 and 47 at the corners thereof, and that supporting pilasters and dividing partitions formed from similar facing pans 1 may be bordered by metal edge trimming strips 5 with corresponding angular corner members 50 applied to the exposed corners thereof.

While certain novel features of this invention have been disclosed herein and are pointed out in the claims, it will be understood that various omissions, substitutions, and changes may be made by those skilled in the art without departing from the spirit of this invention.

What is claimed is:

1. A wall forming structure including in combination; a wall body presenting a pair of spaced facing panels having a reinforcing core sandwiched therebetween, inturned flange sections extending inwardly from said facing panels along a vertical edge and an adjacent horizontal edge of the wall body, a vertical and a horizontal rib formation extending outwardly from the respective vertical and horizontal flange sections adjacent a corner of the wall body, and lip sections flaring outwardly from the vertical and horizontal flange sections of the wall body and terminating adjacent the terminal ends of the respective vertical and horizontal rib formations; a corner bracket presenting a vertical edge trimming leg and a horizontal edge trimming leg extending from the vertical edge trimming leg, each of said edge trimming legs presenting a relatively flat rear face designed to seat against the adjacent flange sections of the wall body, a tongue portion projecting from the terminal end of each of said edge trimming legs, and a longitudinally extending groove formed in the inner faces of said edge trimming legs and snugly telescoping over the adjacent rib formations of the wall body; a semi-tubular edging strip telescoping over and interlocking with the outwardly flared lip sections extending along the vertical edge of the door body with the terminal end of said edging strip telescoping over the adjacent tongue portion projecting from the vertical edge trimming leg; and a semi-tubular edge trimming strip telescoping over and interlocking with the outwardly flared lip sections extending along the horizontal edge of the wall body with the terminal end of said horizontal edging strip telescoping over the adjacent tongue portion projecting from the horizontal edge trimming leg, the outer face of said horizontal edge trimming leg and said vertical edge trimming leg being substantially flush with the outer face of the adjacent edging strip.

2. A door structure including in combination; a door body presenting a pair of spaced facing panels having a reinforcing core sandwiched therebetween, a pair of inturned flange sections extending inwardly from said facing panels and along an edge of the door body, a notch cut-out extending across said edge and into said facing panels, a hinge pintle receiving bracket having an arm section extending into the notch cut-out in the door body, an edge trimming leg projecting from one end of said arm section and positioned in seating relation to the adjacent flange sections of the door body, a tongue portion projecting from the terminal end of said edge trimming leg, a longitudinally extending groove formed in the inner faces of said edge trimming leg and the tongue portion projecting therefrom, a locking rib projecting into said groove and extending outwardly from adjacent parts of the paired flange sections of the door body which are overlapped by said edge trimming leg and tongue portion, paired lip sections flaring outwardly from the inturned flange sections of the door body and extending from the terminal end of said tongue portion, and a semi-tubular edging strip telescoping over and interlocking with the outwardly flared lip sections of the door body and with the terminal end of said edging strip telescoping over the adjacent tongue portion projecting from said edge trimming leg, the outer face of said edge trimming leg being substantially flush with the outer face of the adjacent edging strip.

3. A door structure including in combination; a door body presenting a pair of spaced facing panels having a reinforcing core sandwiched therebetween, a pair of inturned flange sections extending inwardly from said facing panels and along an edge of the door body, a notch cut-out extending across said edge and into said facing panels, said notch cut-out being rimmed by a pair of transversely extending inset ledge portions formed in said facing panels and a pair of spaced inset flange portions extending substantially normal to said inset ledge portions, a hinge pintle receiving bracket having an arm section extending into the notch cut-out in the door body, said arm section presenting spaced grooves which receive the inset flange portions extending from the ledge portions of the door body and a pair of spaced and laterally extending rim forming flanges pocketed in the inset ledge portions of the door body with the outer faces of said rim forming flanges substantially flush with the exposed outer faces of the facing panels, and an edge trimming leg projecting from one end of said arm section and positioned in seating relation to the adjacent flange sections of the door body.

4. A door structure including in combination; a door body presenting a pair of spaced facing panels having a reinforcing core sandwiched therebetween, edge sections extending inwardly from said facing panels along a vertical edge and an adjacent horizontal edge of the door body, and a corner cut-out extending across said vertical and horizontal edge sections and into the facing panels of the door body, said corner cut-out being rimmed by a pair of transversely extending inset ledge portions formed in said facing panels and a pair of inset flange portions extending substantially normal to said ledge portions; a hinge pintle receiving bracket presenting an arm section, an edge trimming section extending from one end of said arm section, a hip section extending from the other end of the arm section, and a saddle section extending from said hip section, said arm section, hip section and saddle section together presenting a pair of spaced and laterally extending rim forming flanges pocketed in the inset ledge portions of the door body with the outer faces of the rim forming flanges substantially flush with the adjacent exposed faces of the facing panels, said arm section also presenting spaced grooves which receive the inset flange portions extending from the ledge portions of the door body, said edge trimming section being positioned in seating relation to the adjacent vertical edge section of the door body and an edge moulding portion extending along the vertical edge of the door body with the terminal end thereof in substantially abutting relation to the terminal end of said edge trimming leg and with the outer face of said edge moulding portion substantially flush with the outer face of said edge trimming leg.

5. A door structure including in combination; a door body presenting a pair of spaced facing panels having a reinforcing core sandwiched therebetween, edge sections extending inwordly from said facing panels along a vertical edge and an adjacent horizontal edge of the door body, and a corner cut-out extending across said vertical and horizontal edge sections and into the facing panels of the door body, said corner cut-out being rimmed by a pair of transversely extending inset ledge portions formed in said facing panels and a pair of inset flange portions extending substantially normal to said ledge portions; a hinge pintle receiving bracket presenting an arm section, an edge trimming leg extending from one end of said arm section, a hip section extending from the other end of the arm section, and a saddle section extending from said hip section, said arm section, hip section and saddle section together presenting a pair of spaced and laterally extending rim forming flanges pocketed in the inset ledge portions of the door body with the outer faces of the rim forming flanges substantially flush with the adjacent exposed faces of the facing panels, said arm section also presenting spaced grooves which receive the inset flange portions extending from the ledge portions of the door body, said edge trimming leg being positioned in seating relation to the adjacent vertical edge section of the door body, and a tongue portion projecting from the terminal end of said edge trimming leg; a vertically extending edge moulding strip secured to the vertical edge section of the door body with the terminal end thereof telescoping over the adjacent tongue portion projecting from said edge trimming leg and with the outer face of said edge moulding strip substantially flush with the outer face of said edge trimming leg; and a horizontally extending edge moulding strip secured to the horizontal edge section of the door body and with the terminal end thereof telescoping into said bracket saddle section.

6. A door structure including in combination; a door body presenting a pair of spaced facing panels having a reinforcing core sandwiched therebetween, inturned flange sections extending inwardly from said facing panels along a vertical edge and an adjacent horizontal edge of the door body, and a corner cut-out extending across said vertical and horizontal edges of the door body and into said facing panels, said corner cut-out being rimmed by a pair of transversely extending inset ledge portions formed in said facing panels and a pair of inset flange portions extending substantially normal to said ledge portions; a hinge pintle receiving bracket presenting an arm section, an edge trimming leg extending from one end of said arm section, a hip section extending from the other end of said arm section, and a saddle section extending from said hip section, said arm section, hip section and saddle section together presenting a pair of spaced and laterally extending rim forming flanges pocketed in the inset ledge portions of the door body with the outer faces of the rim forming flanges substantially flush with the adjacent exposed faces of the facing panels, said arm section also presenting spaced grooves which receive the inset flange portions extending from the ledge portions of the door body, said edge trimming leg being positioned in seating relation to the adjacent vertical flange sections of the door body, a tongue portion projecting from the terminal end of said edge trimming leg, a longitudinally extending groove formed in the inner faces of said edge trimming leg and tongue portion projecting therefrom, a locking rib projecting into said groove and extending outwardly from adjacent parts of the vertical flange sections of the door body which are overlapped by said edge trimming leg and tongue portion, paired lip sections flaring outwardly from the vertical flange sections of the door body and extending from the terminal end of said tongue portion, a vertically extending semi-tubular edging strip telescoping over and interlocking with said vertically extending lip sections with the terminal end of said vertical edging strip telescoped over the adjacent tongue portion projecting from said edge trimming leg and with the outer face of said edging strip substantially flush with the outer face of said edge trimming leg, paired lip sections flaring outwardly from the horizontal flange sections of the door body and extending from the terminal end of said bracket saddle section, a horizontally extending semi-tubular edging strip telescoping over and interlocking with said horizontally extending lip sections of the door body with the terminal end of said edging strip telescoping into said bracket saddle section, and means for securing said bracket saddle section to said horizontally extending edging strip.

7. A door structure including in combination; a door body presenting a pair of spaced facing panels having a reinforcing core sandwiched therebetween, a pair of inturned flange sections extending inwardly from said facing panels and along an edge of the door body, a U-shaped notch cut-out extending across said edge and into the facing panels of the door body and rimmed by a pair of transversely extending inset ledge portions formed in said facing panels, and a pair of spaced inset flange portions extending substantially normal to said ledge portions; and a hinge pintle receiving bracket having a U-shaped saddle part extending into the notch cut-out in the door body and presenting spaced grooves which receive the inset flange portions extending from said ledge portions of the door body, said U-shaped saddle part also presenting a pair of spaced and laterally extending rim forming flanges pocketed in the inset ledge portions of the door body and having the outer faces of said rim forming flanges substantially flush with the exposed outer faces of the facing panels.

8. A door structure including in combination; a door body presenting a pair of spaced facing panels having a reinforcing core sandwiched therebetween, a pair of inturned flange sections extending inwardly from said facing panels and along an edge of the door body, a U-shaped notch cut-out extending across said edge and into said facing panels and rimmed by a pair of transversely extending inset ledge portions formed in said facing panels and a pair of spaced inset flange portions extending substantially normal to said ledge portions; a hinge pintle receiving bracket having a U-shaped saddle part extending into the notch cut-out in the door body and presenting spaced grooves which receive the inset flange portions extending inwardly from said ledge portions of the door body, said U-shaped saddle part presenting a pair of spaced and laterally extending rim forming flanges pocketed in the inset ledge portions of the door body and having the outer faces of said rim forming flanges substantially flush with the exposed outer faces of the facing panels, an edge trimming leg projecting from said saddle part and positioned in seating relation to the adjacent parts of the paired flange sections of the door body, a tongue portion projecting from the terminal end of said edge trimming leg, a longitudinally extending groove formed in the inner face of said edge trimming leg and tongue portion projecting therefrom, a locking rib projecting into said groove and extending outwardly from the adjacent parts of the paired flange sections of the door body which are overlapped by said edge trimming leg and tongue portion, paired lip sections flaring outwardly from the inturned flange sections of the door body and extending from the terminal end of said tongue portion, and a semi-tubular edging strip telescoping over and interlocking with the outwardly flared lip sections of the door body with the terminal end of said edging strip telescoping over the adjacent tongue portion projecting from said edge trimming leg, the outer face of said edge trimming leg being substantially flush with the outer face of the adjacent edging strip.

9. A door structure including in combination; a door body presenting a pair of spaced facing panels having a reinforcing core sandwiched therebetween, an edge section joining said facing panels, a U-shaped notch cut-out extending across said edge section and into said facing panels and rimmed by a pair of transversely extending inset ledge portions formed in said facing panels and a pair of spaced inset flange portions extending substantially normal to said ledge portions; a hinge pintle receiving bracket having a U-shaped saddle part presenting a pair of spaced arm sections and a connecting web section extending into the notch cut-out in the door body and presenting spaced grooves which receive the inset flange portions extending inwardly from said ledge portions of the door body, said U-shaped saddle part also presenting a pair of spaced rim forming flanges extending laterally from the arm sections and connecting web section thereof and pocketed in the inset ledge portions of the door body and having the outer faces of said rim forming flanges substantially flush with the exposed outer faces of the facing panels, a pair of edge trimming legs projecting from the arm sections of said saddle part and positioned in seating relation to adjacent parts of the edge section of the door body, and an edge moulding strip secured to the edge section of the door body and having one end thereof in substantially abutting relation to the terminal end of one of said edge trimming legs and forming a substantially flush joint therebetween.

10. A door structure including in combination; a door body presenting a pair of spaced facing panels having a reinforcing core sandwiched therebetween, edging sections joining said facing panels along the rear vertical edge and the upper horizontal edge of the door body, a U-shaped notch cut-out extending across the rear vertical edge section of the door body adjacent the upper corner thereof and into said facing panels and rimmed by transversely extending inset ledge portions formed in said facing panels and a pair of spaced inset flange portions extending substantially normal to said inset ledge portions; a hinge pintle receiving bracket having a U-shaped saddle part presenting a pair of spaced arm sections and a connecting web section extending into the notch cut-out in the door body, said U-shaped saddle part presenting a pair of spaced rim forming flanges extending laterally from the arm sections and connecting web section thereof and pocketed in the inset ledge portions of the door body and with the outer faces of said rim forming flanges substantially flush with the exposed outer faces of the facing panels, a downwardly extending edge trimming leg and an upwardly extending edge trimming leg projecting from the arm sections of the saddle part and positioned in seating relation to adjacent parts of the vertical edge section of the door body, an edge trimming leg extending horizontally from the upwardly extending edge trimming leg and seating against adjacent parts of the horizontal edge section of the door body, a vertical edge moulding portion having one end thereof substantially in abutting relation to the terminal end of said downwardly extending edge trimming leg and forming a substantially flush joint therewith, and a horizontal edge moulding portion having one end thereof substantially in abutting relation to the terminal end of said horizontal edge trimming leg and forming a substantially flush joint therewith.

11. A door structure including in combination; a door body presenting a pair of spaced facing panels having a reinforcing core sandwiched therebetween, edging sections joining said facing panels along the rear vertical edge and the upper horizontal edge of the door body, a U-shaped notch cut-out extending across the rear vertical edge section of the door body adjacent the upper corner thereof and into said facing panels, said notch cut-out presenting a pair of transversely extending inset ledge portions formed in said facing panels and a pair of spaced inset flange portions extending substantially normal to said panel ledge portions; a hinge pintle receiving bracket having a U-shaped saddle part presenting a pair of spaced arm sections and a connecting web section extending into the notch cut-out in the door body, said U-shaped saddle part presenting spaced grooves which receive the inset flange portions extending inwardly from said ledge portions of the door body and a pair of spaced rim forming flanges extending laterally from the arm sections and connecting web section thereof and pocketed in the inset ledge portions of the door body and with the outer faces of said rim forming flanges substantially flush with the exposed outer faces of the facing panels, a downwardly extending edge trimming leg and an upwardly extending edge trimming leg projecting from the arm sections of the saddle part and positioned in seating relation to adjacent parts of the vertical edge section of the door body, an edge trimming leg extending horizontally from the upwardly extending edge trimming leg and seating against adjacent parts of the horizontal edge section of the door body, longitudinally extending grooves formed in the inner faces of said edge trimming legs, locking ribs projecting into said grooves and extending outwardly from those parts of the horizontal and vertical edge sections of the door body which are overlapped by said edge trimming legs, a vertical edge moulding portion having one end thereof substantially in abutting relation to the terminal end of said downwardly extending edge trimming leg and forming a substantially flush joint therewith, and a horizontal edge moulding portion having one end thereof substantially in abutting relation to the terminal end of said horizontal edge trimming leg and forming a substantially flush joint therewith.

12. A door structure including in combination; a door body presenting a pair of spaced facing panels having a reinforcing core sandwiched therebetween, a pair of inturned flange sections extending inwardly from said facing panels and along the rear vertical edge and the upper horizontal edge of the door body, a notch cut-out in a vertical edge of the door body adjacent an upper corner thereof and extending into said facing panels, a hinge pintle receiving bracket having a U-shaped saddle part extending into the notch cut-out in the door body, a downwardly extending edge trimming leg and an upwardly extending edge trimming leg projecting from said saddle part and positioned in seating relation to adjacent parts of the vertically extending flange sections of the door body, a horizontal edge trimming leg extending from the upwardly extending edge trimming leg and seating against adjacent parts of the horizontally extending flange sections of the door body, a tongue portion projecting from the terminal end of said downwardly extending edge trimming leg and from the terminal end of said horizontal edge trimming leg, longitudinally extending grooves formed in the inner faces of said edge trimming legs and tongue portions projecting therefrom, locking ribs projecting into said grooves and extending outwardly from adjacent parts of the paired flange sections of the door body which are overlapped by said edge trimming legs and tongue portions, paired lip sections flaring outwardly from the inturned flange sections of the door body and extending from the terminal ends of said bracket tongue portions and along the upper horizontal edge and rear vertical edge of the door body, a semi-tubular edging strip telescoping over and interlocking with the outwardly flared lip sections extending along the upper horizontal edge of the door body and with the terminal end of said edging strip telescoping over the adjacent tongue portion projecting from said horizontal edge trimming leg, and a semi-tubular edging strip telescoping over and interlocking with the outwardly flared lip sections extending along the vertical edge of the door body and with the terminal end of said edging strip telescoping over the adjacent tongue portion projecting from said downwardly extending edge trimming leg, the outer face of said horizontal edge trimming leg and said downwardly extending edge trimming leg being substantially flush with the outer face of the adjacent edging strip.

13. An integrally formed edge trimming member designed for attachment to a hollow metal wall-forming body and wherein said wall-forming body presents a relatively flat edge section having a relatively narrow rib extending medially of and projecting outwardly from said relatively flat edge section, and a semi-tubular moulding formation extending from said relatively flat edge section; said edge trimming member including a body section having an outer face in contour conformity with the moulding formation of said wall-forming body and a relatively flat rear face seating against the relatively flat edge section of the wall-forming body, a tongue portion extending from one end of said body section and designed to telescope into the end portion of the semi-tubular moulding formation of the wall-forming body, and a longitudinal groove formed in the flat inside face of said body section of the edge trimming member and designed to snugly telescope over and interlock with the corresponding rib projecting from the relatively flat edge section of the wall-forming body.

14. An integrally formed corner bracket designed for attachment to the corner-forming edges of a wall-forming body and wherein said wall-forming body presents relatively flat edge sections meeting at a corner of the wall-forming body, a relatively narrow rib extending medially of and projecting outwardly from each relatively flat edge section, and a semi-tubular moulding formation extending from a relatively flat edge section; said corner bracket having a pair of angularly extending edge trimming legs each presenting an outer face in contour conformity with the moulding formation of the wall-forming body and a relatively flat rear face seating against the adjacent relatively flat edge section of the wall-forming body, a tongue portion extending from the terminal end of one of said edge trimming legs and designed to telescope into the end portion of the adjacent moulding formation of the wall-forming body, and longitudinal groove formed in the flat inside faces of each of said edge trimming legs of the corner bracket and designed to snugly telescope over and interlock with the corresponding ribs projecting from the adjacent relatively flat edge sections of the wall-forming body.

15. An integrally formed corner bracket designed for attachment to the corner-forming edges of a wall-forming body and wherein said wall-forming body presents relatively flat edge sections meeting at a corner of the wall-forming body, a relatively narrow rib extending medially of and projecting outwardly from each relatively flat edge section, and a pair of semi-tubular moulding formations extending from said relatively flat edge sections; said corner bracket having a pair of angularly extending edge trimming legs each presenting an outer face in contour conformity with the adjacent moulding formation of the wall-forming body and a relatively flat rear face seating against the adjacent relatively flat edge section of the wall-forming body, a tongue portion extending from the terminal end of each of said edge trimming legs and designed to telescope into the end of the adjacent moulding formation of the wall-forming body, and a longitudinal groove formed in the flat inside faces of each of said edge trimming legs of the corner bracket and designed to snugly telescope over and interlock with the corresponding ribs projecting from the adjacent relatively flat edge sections of the wall-forming body.

16. An integrally formed bracket designed for attachment to a hollow metal wall-forming body and wherein said wall-forming body presents a relatively flat edge section having a relatively narrow rib extending medially of and projecting outwardly from said relatively flat edge section, a semi-tubular moulding formation whose end portion partially overlaps said rib, and a notch cutout presenting an edge extending substantially normal to the opposite end of said relatively flat edge section; said bracket presenting an arm section having spaced rim-forming flanges designed to telescope over the notched edges of the wall-forming body, and an edge trimming leg designed to overlap the relatively flat edge section of the wall-forming body; said edge trimming leg including a body section having an outer face in contour conformity with the moulding formation of said wall-forming body and a relatively flat rear face designed to seat against the relatively flat edge section of the wall-forming body, a tongue portion extending from one end of said body section and designed to telescope into the end portion of the semi-tubular moulding formation of the wall-forming body, a longitudinal groove formed in the flat inside face of said body section and tongue portion of the edge trimming member and designed to snugly telescope over and interlock with the corresponding rib projecting from the relatively flat edge section of the wall-forming body.

17. An integrally formed bracket designed for attachment to a hollow metal wall-forming body and wherein said wall-forming body presents a corner cut-out, a relatively flat edge section extending from said corner cut-out and having a relatively narrow rib extending medially of and projecting outwardly from said relatively flat edge section, and a semi-tubular moulding formation whose end portion partially overlaps said rib; said bracket having an arm section, a hip section extending from one end of said arm section, an offset saddle section extending from said hip section, spaced rim-forming flanges extending from the opposite sides of said arm section, hip section and saddle section and designed to interfit with the edges of the corner cut-out of the wall-forming body, and an edge trimming leg projecting from the other end of said arm section, said edge trimming leg including a body section having an outer face in contour conformity with the moulding formation of said wall-forming body and a relatively flat rear face designed to seat against the relatively flat edge section of the wall-forming body, a tongue portion extending from one end of said body section and designed to telescope into the semi-tubular moulding formation of the wall-forming body, and a longitudinal groove formed in the flat inside face of said body section and tongue portion of the edge trimming leg and designed to snugly telescope over and interlock with the corresponding rib projecting from the relatively flat edge section of the wall-forming body.

18. An integrally formed bracket designed for attachment to a hollow metal wall-forming body and wherein the wall-forming body presents a notch cutout in one edge thereof, a relatively flat edge section extending from an exterior end of said cutout, a relatively narrow rib extending medially of and projecting outwardly from said relatively flat edge section, and a semi-tubular moulding formation extending from the relatively flat edge section and whose end portion partially overlaps the rib extending from the relatively flat end section; said bracket including a U-shaped saddle part which includes a pair of spaced arm sections joined by a web section and rimmed by a pair of spaced flange sections designed to interfit with the notch cutout in the wall-forming body, an edge trimming leg extending from one of the arm sections of said saddle part and designed to overlap the relatively flat edge section of the wall-forming body, said edge trimming leg including a body section having an outer face in contour conformity with the moulding formation of said wall-forming body and a relatively flat rear face designed to seat against the relatively flat edge section of the wall-forming body, a tongue portion extending from one end of said body section and designed to telescope into the semi-tubular moulding formation of the wall-forming body, and a longitudinal groove formed in the flat inside face of said body section and tongue portion of the edge trimming leg and designed to snugly telescope over and interlock with the corresponding rib projecting from the relatively flat edge section of the wall-forming body.

19. An integrally formed bracket designed for attachment to a hollow metal wall-forming body and wherein the wall-forming body presents a notch cutout in one edge thereof, a pair of relatively flat edge sections extending in opposite directions and in aligned relation from the exterior ends of said cutout, a relatively narrow rib extending medially of and projecting outwardly from each of said relatively flat edge sections, and a semi-tubular moulding formation extending from one of said relatively flat edge sections and whose end portion partially overlaps the rib extending therefrom; said bracket including a U-shaped saddle part which includes a pair of spaced arm sections joined by a web section and rimmed by a pair of spaced flange sections designed to interfit with the notch cutout in the wall-forming body, a pair of edge trimming legs extending in opposite directions from the respective arm sections of said saddle part and designed to overlap the respecting relatively flat edge sections of the wall-forming body, each of said edge trimming legs having a body portion which presents an outer face in contour conformity with the moulding formation of the wall-forming body and a relatively flat rear face designed to seat against the adjacent relatively flat edge section of the wall-forming body, a tongue portion extending from the terminal end of one of said edge trimming legs and designed to telescope into the end portion of the adjacent moulding formation of the wall-forming body, and a longitudinal groove formed in the flat inside faces of the body portions and tongue portions of said edge trimming legs and designed to snugly telescope over and interlock with the corresponding ribs projecting from the adjacent relatively flat edge sections of the wall-forming body.

20. An integrally formed bracket designed for attachment to a hollow metal wall-forming body and wherein the wall-forming body presents a U-shaped cutout in one edge thereof, a first and second relatively flat edge section extending in opposite directions and in aligned relation from the exterior ends of said cutout, a third relatively flat edge section extending in a direction substantially normal to said second relatively flat edge section, a relatively narrow rib extending medially of and projecting outwardly from each of said relatively flat edge sections, and a pair of semi-tubular moulding formations extending from the respective first and third relatively flat edge sections and whose end portions partially overlap the respective ribs extending from said first and third relatively flat edge sections; said bracket including a U-shaped saddle part which includes a pair of spaced arm sections joined by a web section and rimmed by a pair of flange sections designed to interfit with the notch cutout in the wall-forming body, a first and second edge trimming leg extending in opposite directions from the respective arm sections of said saddle part and designed to overlap the first and second relatively flat edge sections of the wall-forming body, and a third edge trimming leg extending substantially normal to said second edge trimming leg and designed to overlap the third relatively flat edge section of the wall-forming body; each of said first, second and third edge trimming legs including a body section which presents an outer face in contour conformity with the moulding formations of the wall-forming body and a relatively flat rear face designed to seat against the adjacent relatively flat edge section of the wall-forming body, a tongue portion extending from the body sections of the first and third edge trimming legs which are designed to telescope into the end portions of the adjacent moulding formations of the wall-forming body, and longitudinal grooves formed in the flat inside faces of the body sections of each of said edge trimming legs and formed in the inside faces of the tongue portions extending from the first and third edge trimming legs, said grooves being designed to snugly telescope over and interlock with the corresponding ribs projecting from the adjacent relatively flat edge sections of the wall-forming body.

21. A wall-forming structure including in combination; a hollow metal wall-forming body presenting a pair of spaced metal facing panels joined by a relatively flat edge section, a relatively thin rib formation extending medially of and outwardly from said flat edge section, and a contoured edge section extending from one end of said flat edge section; an integral edge trimming member presenting a body section having a contoured outer face substantially in contour conformity with the contoured edge section of the wall-forming body and a relatively flat rear face snugly seating against the adjacent flat edge section of the wall-forming body, a tongue portion projecting from a terminal end of the body section of said edge trimming member and telescoping into said contoured edge section of the wall-forming body, and a longitudinally extending groove formed in the rear face of the body section of said edge trimming member which snugly telescopes over the adjacent rib of the wall-forming body.

22. A wall-forming structure including in combination; a hollow metal wall-forming body presenting a pair of spaced metal facing panels joined by relatively flat edge sections meeting at a corner of the wall-forming body, a relatively narrow rib extending medially of and projecting outwardly from each of said relatively flat edge sections, and a semi-tubular moulding formation extending from one of said relatively flat edge sections; a corner bracket presenting a pair of angularly extending edge trimming legs each presenting an outer face in contour conformity with the adjacent moulding formation of the wall-forming body and a relatively flat rear face snugly seating against the adjacent relatively flat edge section of the wall-forming body, a tongue portion extending from the terminal end of one of said edge trimming legs and telescoped into the end of the adjacent moulding formation of the wall-forming body, and a longitudinal groove formed in the flat inside faces of said edge trimming legs which snugly telescope over the outwardly projecting ribs of the wall-forming body.

23. A wall-forming structure including in combination; a hollow metal wall-forming body presenting a pair of spaced metal facing panels joined by relatively flat edge sections meeting at a corner of the wall-forming body, a relatively narrow rib extending medially of and projecting outwardly from each of said relatively flat edge sections, and a semi-tubular moulding formation extending from each of said relatively flat edge sections; said corner brackets presenting a pair of angularly extending edge trimming legs each presenting an outer face in contour conformity with the adjacent moulding formation of the wall-forming body and a relatively flat rear face snugly seating against the adjacent relatively flat edge section of the wall-forming body, a tongue portion extending from the terminal end of each of said edge trimming legs and telescoped into the end of the adjacent moulding formation of the wall-forming body, and a longitudinal groove formed in the flat inside faces of said edge trimming legs which snugly telescope over the adjacent outwardly projecting ribs of the wall forming body.

24. A wall-forming structure including in combination; a hollow metal wall-forming body presenting a pair of spaced metal facing panels joined by a relatively flat edge section, a relatively thin rib extending medially of and outwardly from said flat edge section, a contoured edge section extending from one end of said flat edge section and having an end portion which partially overlaps said rib, and a notch cut-out in the wall forming body which presents an edge extending substantially normal to the other end of said relatively flat edge section; an integral bracket having an arm section presenting spaced rim forming flanges extending from the opposite sides of said arm section and telescoping over the notched edge of said well-forming body, and an edge trimming leg projecting from one end of said arm section and overlapping the adjacent relatively flat edge section of the wall-forming body; said edge trimming leg presenting a body section having a contoured outer face substantially in contour conformity with the adjacent contoured edge section of the wall-forming body and a relatively flat rear face snugly seating against the adjacent relatively flat edge section of the wall forming body, a tongue portion projecting from a terminal end of the body section of said edge trimming leg and telescoping into said contoured edge section of the wall-forming body, and a longitudinally extending groove formed in the rear face of the body section and tongue portion of said edge trimming leg which snugly telescopes over the adjacent rib of the wall-forming body.

25. A wall-forming structure including in combination; a hollow metal wall-forming body presenting a pair of spaced metal facing panels joined by a relatively flat edge section, a relatively thin rib formation extending medially of and outwardly from said flat edge section, a contoured edge section extending from one end of said flat edge section and having an end portion which partially overlaps said rib formation, and a corner cut-out presenting an edge extending substantially normal to the other end of said relatively flat edge section; an integral bracket having an arm section, a hip section extending from one end of said arm section, an offset saddle section extending from said hip section, spaced rim forming flanges extending from the opposite sides of said arm section, hip section and saddle section and designed to interfit with the edges of the corner cut-out of said wall-forming body, and an edge trimming leg projecting from the other end of said arm section, said edge trimming leg presenting a body section having a contoured outer face substantially in contour conformity with the contoured edge section of the wall-forming body and a relatively flat rear face snugly seating against the adjacent flat edge section of the wall-forming body, a tongue portion projecting from a terminal end of the body section of said edge trimming leg and telescoping into the adjacent contoured edge section of the wall forming body, and a longitudinally extending groove formed in the rear face of the body section and tongue portion of said edge trimming leg which snugly telescopes over the adjacent rib formation of the wall-forming body.

26. A wall-forming structure including in combination; a hollow metal wall-forming body presenting a pair of spaced metal facing panels, a U-shaped notch cut-out in one edge of said wall-forming body, a relatively flat edge section extending from an exterior end of said cut-out, a relatively narrow rib extending medially of and projecting outwardly from said relatively flat edge section, and a semi-tubular moulding formation extending from said relatively flat edge section and whose end portion partially overlaps the rib associated with said relatively flat edge section; a bracket which includes a U-shaped saddle part which presents a pair of spaced arm sections joined by a web section and rimmed by a pair of spaced flange sections interfitted into the U-shaped cut-out in the wall-forming body, and an edge trimming leg extending from the outer end of one of the arm sections of the saddle part and overlapping the adjacent relatively flat edge section of the wall-forming body, said edge trimming leg including a body section which presents a contoured outer face substantially in contour conformity with the adjacent contoured edge section of the wall-forming body and a relatively flat rear face snugly seating against the adjacent relatively flat edge section of the wall-forming body, a tongue portion projecting from a terminal end of the body section of said edge trimming leg and telescoping into said contoured edge section of the wall-forming body, and a longitudinally extending groove formed in the rear face of the body section and tongue portion of said edge trimming leg which snugly telescopes over the adjacent rib formation of the wall-forming body.

27. A wall-forming structure including in combination; a hollow metal wall-forming body presenting a pair of spaced metal facing panels, a U-shaped notch cut-out in one edge of said wall-forming body, a first and second relatively flat edge section extending in opposite directions and in aligned relation from the exterior ends of said cut-out, a relatively narrow rib extending medially of and projecting outwardly from each of said relatively flat edge sections, and a semi-tubular moulding formation extending from said first relatively flat edge section and whose end portion partially overlaps the rib associated with said first relatively flat edge section; a bracket which includes a U-shaped saddle part which presents a pair of spaced arm sections joined by a web section and rimmed by a pair of spaced flange sections interfitted into the U-shaped cut-out in the wall-forming body, a first and second edge trimming leg extending in opposite directions from the respective arm sections of the saddle part and overlapping the first and second relatively flat edge sections of the wall forming body, each of said first and second edge trimming legs including a body section which presents an outer face substantially in contour conformity with the moulding formation of the wall-forming body and a relatively flat rear face designed to snugly seat against the adjacent relatively flat edge section of the wall-forming body, a tongue portion extending from the terminal end of said first edge trimming leg and telescoped into the end of the adjacent moulding formation of the wall-forming body, and a longitudinal groove formed in the flat inside faces of said edge trimming legs and the tongue portion extending from said first edge trimming leg which snugly telescopes over the adjacent outwardly projecting ribs of the wall-forming body.

28. A wall-forming structure including in combination; a hollow metal wall-forming body presenting a pair of spaced metal facing panels, a U-shaped notch cut-out in one edge of said wall-forming body, a first and second relatively flat edge section extending in opposite directions and in aligned relation from the exterior ends of said cut-out, a third relatively flat edge section extending in a direction substantially normal to said second relatively flat edge section, a relatively narrow rib extending medially of and projecting outwardly from each of said relatively flat edge sections, and a pair of semi-tubular moulding formations extending from the respective first and third relatively flat edge sections and whose end portions partially overlap the respective ribs associated with the first and third relatively flat end sections; a bracket which includes a U-shaped saddle part which presents a pair of spaced arm sections joined by a web section and rimmed by a pair of spaced flange sections interfitted into the U-shaped cut-out in the wall-forming body, a first and second edge trimming leg extending in opposite directions from the respective arm sections of the saddle part and overlapping the first and second relatively flat edge sections of the wall-forming body, and a third edge trimming leg extending in a direction substantially normal to said second edge trimming leg and overlapping the third relatively flat edge section of the wall-forming body; each of said first, second and third edge trimming legs including a body section which presents an outer face substantially in contour conformity with the moulding formations of the wall-forming body and a relatively flat rear face designed to snugly seat against the adjacent relatively flat edge section of the wall-forming body, a tongue portion extending from the terminal end of the first and third edge trimming legs and telescoped into the end of the adjacent moulding formation of the wall-forming body, and a longitudinal groove formed in the flat inside faces of each of said edge trimming legs and the tongue portions associated with said first and third edge trimming legs and which snugly telescope over the adjacent outwardly projecting ribs of the wall-forming body.

References Cited in the file of this patent

UNITED STATES PATENTS

| | | |
|---|---|---|
| 2,082,431 | Tripp | June 1, 1937 |
| 2,878,531 | Benham | Mar. 24, 1959 |